United States Patent [19]

Stanfield et al.

[11] Patent Number: 5,545,855

[45] Date of Patent: Aug. 13, 1996

[54] ELECTRONIC FISH SCALE FOR CODING AND STORING WEIGHTS AND DISPLAYING SAME IN INVERSE ORDER

[75] Inventors: James R. Stanfield, Peoria; Robert A. Daquilante; Bobby G. Lanham, Jr., both of Glendale, Ariz.

[73] Assignee: Advanced Fishing Technologies, Inc., Peoria, Ariz.

[21] Appl. No.: 343,620

[22] Filed: Nov. 22, 1994

[51] Int. Cl.⁶ ................................................. G01G 19/22
[52] U.S. Cl. .................... 177/25.13; 177/45; 177/148; 177/238
[58] Field of Search ................... 177/1, 3, 4, 25.17, 177/5, 15, 25.13, 45, 17, 126, 127, 238, 263, 25.18, 180, 148, 149, 25.19; 364/567

[56] References Cited

U.S. PATENT DOCUMENTS

| | | | |
|---|---|---|---|
| 2,603,474 | 7/1952 | Mandolf et al. | 177/149 |
| 4,563,739 | 1/1986 | Gerpheide et al. | 177/25.19 X |
| 4,660,666 | 4/1987 | Reder et al. | 177/148 |
| 4,914,611 | 4/1990 | Yamanaka et al. | 364/567 |
| 4,936,399 | 6/1990 | Christman et al. | 177/149 X |
| 4,961,533 | 10/1990 | Teller et al. | 177/25.19 |
| 5,031,710 | 7/1991 | Parker et al. | 177/210 FP |
| 5,121,328 | 6/1992 | Sakai et al. | 177/4 x |

*Primary Examiner*—Peter S. Wong
*Assistant Examiner*—Randy W. Gibson
*Attorney, Agent, or Firm*—Joseph H. Roediger

[57] ABSTRACT

An electronic scale for use in fishing competitions employing a load cell for accurate measurement and including memory for storing and coding measured fish weights. The scale automatically sorts and scrolls through the stored information to display the code and weight of the lightest fish to permit immediate culling of the catch by the user.

14 Claims, 4 Drawing Sheets

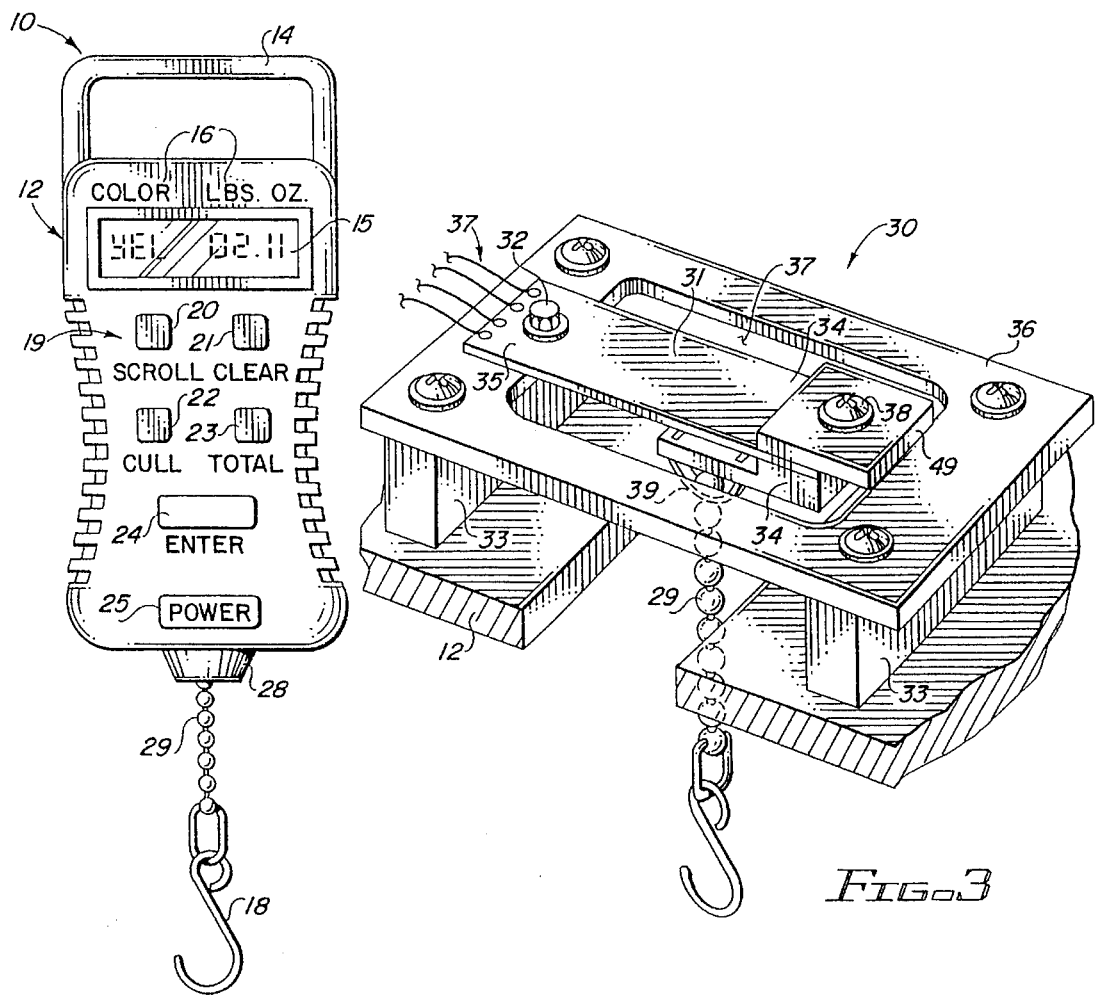
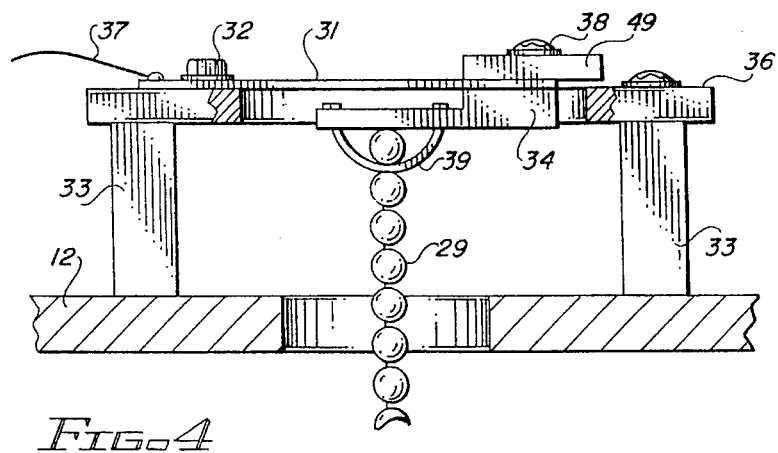

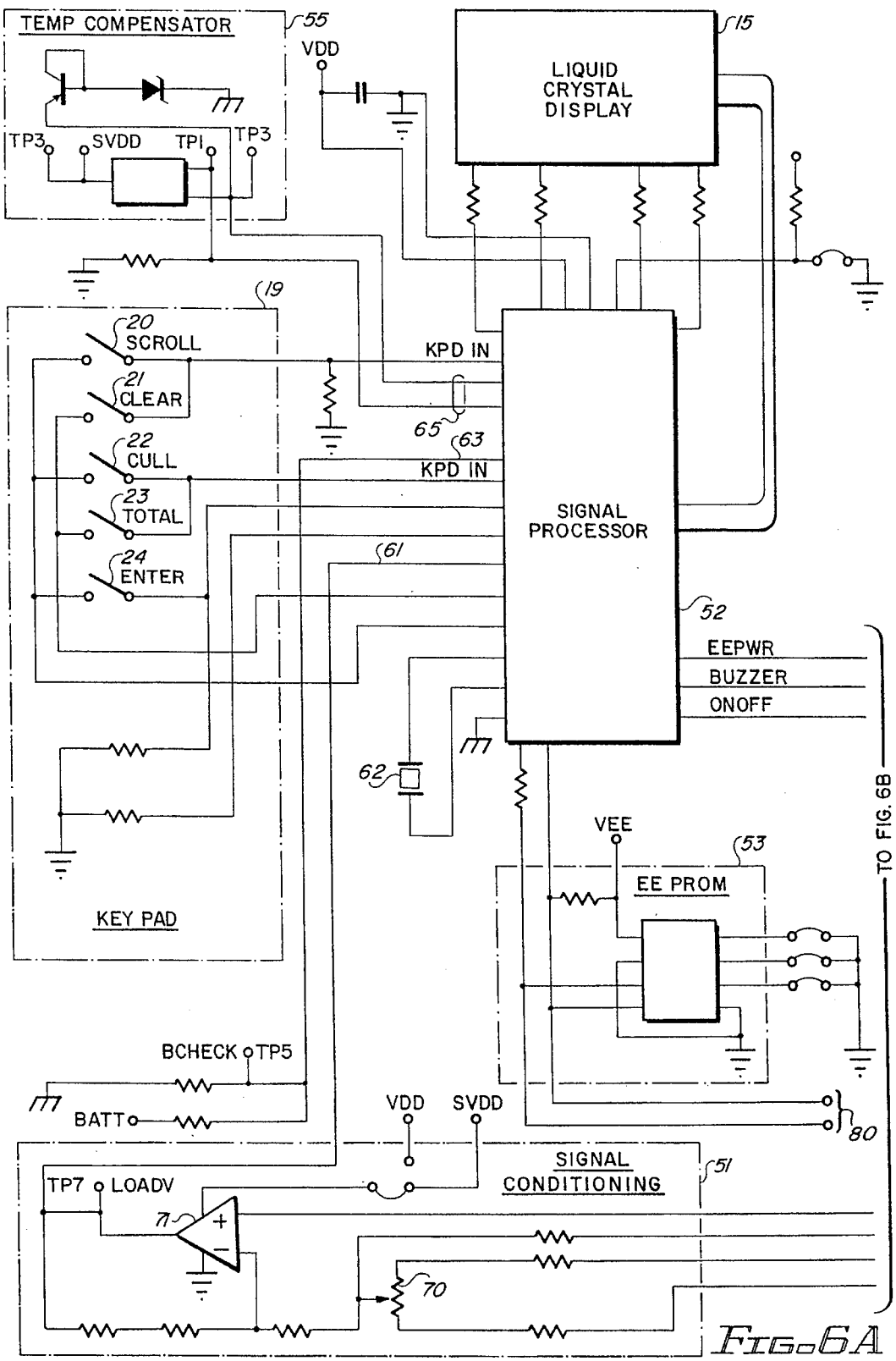

ELECTRONIC FISH SCALE FOR CODING AND STORING WEIGHTS AND DISPLAYING SAME IN INVERSE ORDER

BACKGROUND OF THE INVENTION

This invention relates to an electronic fish scale for weighing, coding and storing coded fish weights followed by sequentially displaying stored data in inverse order to facilitate culling of the lightest fish in a catch.

The sport of competitive fishing has experienced significant growth in recent years. Competitive tournaments with substantial prizes at stake are being held throughout the country. The number of participants grows each year and the public interest has grown accordingly. Due to increased interest by commercial sponsors, the size of prizes available to the winners of the competitions has grown similarly. The basis of competitive fishing is to recognize the fisherman obtaining the highest gross total weight of a catch consisting of a predetermined number of fish made within a stated period. The gross total weight is computed from the preset number of fish established by the rules of that particular competition, typically seven or five fish define the catch. Thus, the competitive fisherman is continually concerned with culling fish from the catch in his live well and retaining only the heaviest fish caught. As a competition begins, the competitor is continually adding to his catch. Ultimately, the preset number of fish is reached. Continued success in catching more than the preset number in the stated period requires the fisherman to make decisions concerning the retention of fish in his catch.

Since the success of a competitor is due in part to his ability to continue fishing during the entire allotted period, time devoted to decision making followed by culling of the lightest fish reduces the amount of time in which the fisherman has his lure in the water. Typically, the competitive fisherman utilizes a scale to weigh each fish at the time of catch and records the weight coupled with assigning a corresponding color code to each fish. Then, he attaches the appropriate colored tag and places the tagged fish in a live well. When the preset number is reached, the competitive fisherman must determine whether any newly caught fish should be substituted for a previously caught fish or returned to the water. If this fish is to be substituted for one previously caught, the fisherman must scan his record and determine which fish he has to withdraw from the live well to make an advantageous substitution. In addition, the fisherman normally maintains a running weight total on his tablet so that he has an idea where he stands comparatively during the period of competition. All of the manual data entering, numerical computations and culling decisions take place when the fisherman is not actively engaged in fishing. As a result, competitive fishing time is lost. The time loss is significant since the marking and computation take place in a wet environment which require the use of special markers and writing surfaces. It is not uncommon for a fisherman to have to spend valuable time looking for a grease pen to make weight notations on his tablet.

Accordingly, an objective of the present invention is to provide an electronic fish scale which weighs, codes and stores the weights of individual fish without requiring the fisherman to make manual entries. In addition, the present invention enables the competitive fisherman to quickly determine when the fish being weighed is heavier than the smallest fish in his catch and display the proper coding for the cull. This invention enables the fisherman to quickly determine if he should cull his catch to retain only the heaviest fish and the fish to be withdrawn from the live well with accuracy and precision. The time period required for data entry and decision-making by the fisherman is substantially reduced.

The subject invention is configured to be hand-held with the fisherman's free hand available to scroll through the stored data. The device includes a digital display to quickly provide the fisherman with the information necessary to affect his cull. Also, the invention enables the fisherman to display the total weight of his catch to that moment at any time in the competition. As the invention is to be used in the outdoors under rugged conditions, the present invention utilizes a load cell to conduct the weighing operation thereby providing a durable and accurate fish scale. This device exhibits sensitivity of measurement and provides reliable operation in the outdoor environment.

SUMMARY OF THE INVENTION

The present invention is directed to an electronic scale and display device for weighing, coding and sequentially displaying data from a plurality of individually weighed units, typically fish. The device includes a weighing circuit having a transducer which generates an electrical signal in response to and indicative of an applied weight.

The electrical signals are supplied to a microprocessor which serves as a coding signal generator to assign a code signal to each of the electrical signals produced by the transducer. The electrical signal from the transducer and the code signal from the microprocessor are paired and supplied to a memory for storage. The microprocessor is responsive to external actuation to recall the stored coded data.

A keypad is provided in the external housing of the device with the keys controlling the operation of the microprocessor circuit. A display panel provided in the housing is coupled to the microprocessor for displaying unit weight data and code information. The actuation of selected keys on the keypad results in the microprocessor providing unit weight data and code information for display in a manner determined by the actuation of selected keys. Initially, the application of a weight to the weighing circuit coupled with the assigning of a code signal causes a readout at the display panel of the weight and code assigned thereto. The weight and code are stored in the memory. The stored weights are summed to display a total upon request. Alternatively, the stored weights and codes can be scrolled through for sequential display upon actuation of the appropriate key. In the embodiment to be utilized by competitive fisherman, the scrolling function sequentially displays unit weights and associated codes. When utilizing the culling function, the lightest weight unit is displayed. Upon reading the code for the lightest weight unit, the competitive fisherman can then make his decision regarding the substitution of fish in the live well and return promptly to active fishing.

Further features and advantages of the invention will become more readily apparent from the following description of a preferred embodiment when taken in conjunction with the accompanying drawings.

BRIEF DESCRIPTION OF THE DRAWINGS

FIG. 1 is a plan view showing of a preferred embodiment of the invention.

FIG. 4 is a side view of the load cell shown in FIG. 3.

FIG. 5 is a block schematic diagram of the embodiment of FIG. 1.

FIGS. 6A and 6B are a detailed electrical schematic of the embodiment of FIG. 1.

DESCRIPTION OF THE PREFERRED EMBODIMENT

Figure 2:
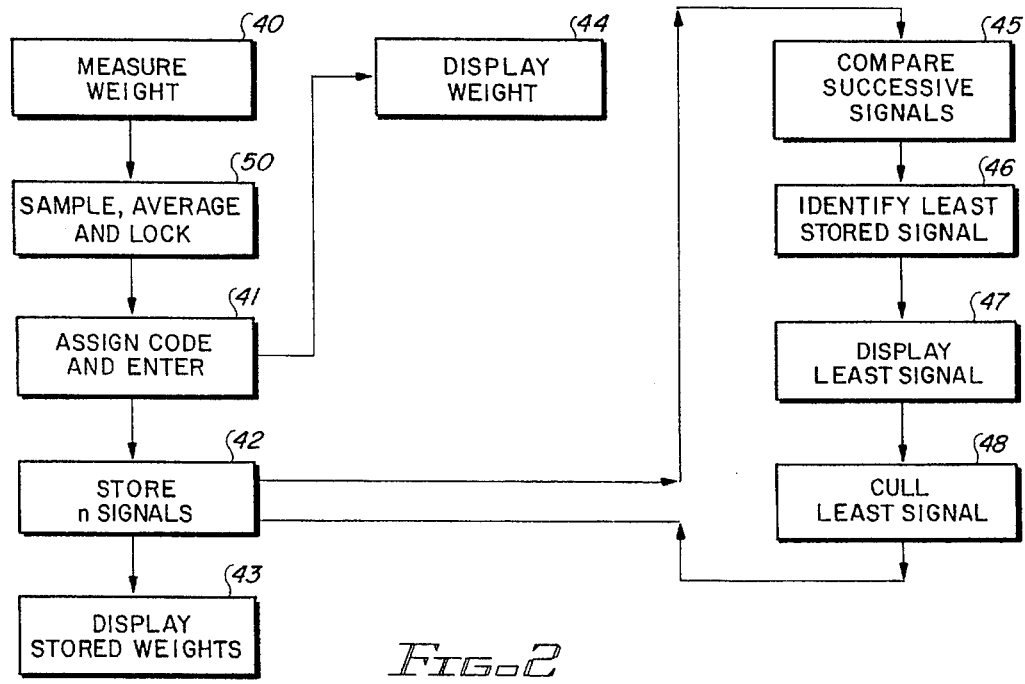
FIG. 2 is a block diagram showing the sequence of steps taken during the operation of the embodiment of FIG. 1.

Referring now to FIG. 1, a preferred embodiment of the invention is shown comprising a water-resistant case 12 having a supporting handle 14 at one end thereof. The case is provided with a passageway through a sealing grommet 28 at the opposing end thereof. As shown, the case is non-uniform in width with a centrally-located narrow region to facilitate hand gripping and is provided with a pair of opposing serrated edges to establish a firm grip. The electronic fish scale 10 is a compact water-resistant unit with a digital display 15 and a keypad 19 positioned therebeneath on one surface thereof. Legends 16 are placed on the case above the display 15 and beneath the individual keys in keypad 19. A chain 29 provided with a weighing hook 18 at its free end extends downwardly from case 12. The chain is coupled internally to the transducer 30 as shown more clearly in FIGS. 3 and 4. The weighing hook 18 receives the unit to be weighed.

The keypad 19 contains individual function keys as well as on-off switch 25. In practice, a power saving timing circuit can be utilized to override the power switch 25 if no functions have been utilized during a predetermined period of time. In use, the device 10 is oriented as shown with either the handle 14 being used or the body of the case being gripped by the hand of the user. The article being weighed, typically a fish, is affixed to the hook 18 and its weight is displayed beneath the LBS. and OZ. legends. When stored, a code is automatically assigned to the unit weight by the signal processor and is displayed beneath the color legend. In FIG. 1, the code assigned is YEL and the weight shown is 2 pounds 11 ounces. The fish has a corresponding color tag attached and is placed in a live well for storage. Displayed information can be added to the memory storage within the case by actuating key 24 of the keypad.

The sequence of steps occurring during operation of the device following attachment of a fish to a hook 18 is shown in the process diagram of FIG. 2 wherein the first step following activation of the power switch 25 is shown in block 40 as the measure weight step. Since the platform of the user is not firmly established and the fish may be actively moving, when engaged on the hook, the scale compensates for variations by averaging a number of successive weighings during a short interval. During this interval, the display panel 15 reads zero. When the averaging is completed, the weight determination is fixed or locked in the signal processor and displayed. A code is assigned and displayed with the weight when the weight averaging is completed with both weight and code information being entered into the internal memory of the device. The capacity of the device is typically seven entries for fishing applications. This is a frequently used maximum number of fish allowed in determining performance in a fishing competition. However, this number can vary for different applications so that block 42 shows the legend STORE n SIGNALS. As will later be explained, the number of coded and stored signals can be changed by assigning zero values to excess codes.

The actuation of key 20 initiates a scrolling operation through the stored signals. This sequence occurs in the signal processor and readout occurs sequentially in accordance with a preprogrammed code sequence, for example red, blue, yellow, green, brown, orange and plain, corresponding to the tags attached to the individual fish. The use of key 22 provides a cull signal to the internal microprocessor which automatically removes the least signal from the storage memory and frees the assigned code for the new entry. At the same time, the fisherman takes this information and removes the corresponding coded fish from his live well replacing it with the latest catch with confidence that this substitution has increased the total weight of his catch.

The actuation of key 23 causes the total of the stored weight signals to be displayed at any time. This key does not initiate any scrolling or individual displays but is merely to provide a current total figure regardless of the number of entries in the memory. The key 21 is a clear key which removes the weight entry for a given code and assigns a zero to that code. The numerical culling provided by the microprocessor ignores zero weights so that the device capacity can be preset to conform to the rules of the competition. In other words, a seven unit capacity device 10 can be preset for a five fish competition by using the clear key for two different codes. The actuation of the key 21, and subsequent actuation of key 24 will assign zeros to the weight value, if done twice, for two color codes. The fisherman can thereby provide a five unit capacity for the device. Subsequent actuation of key 22 will ignore the two codes having the assigned zero values.

Figure 3:
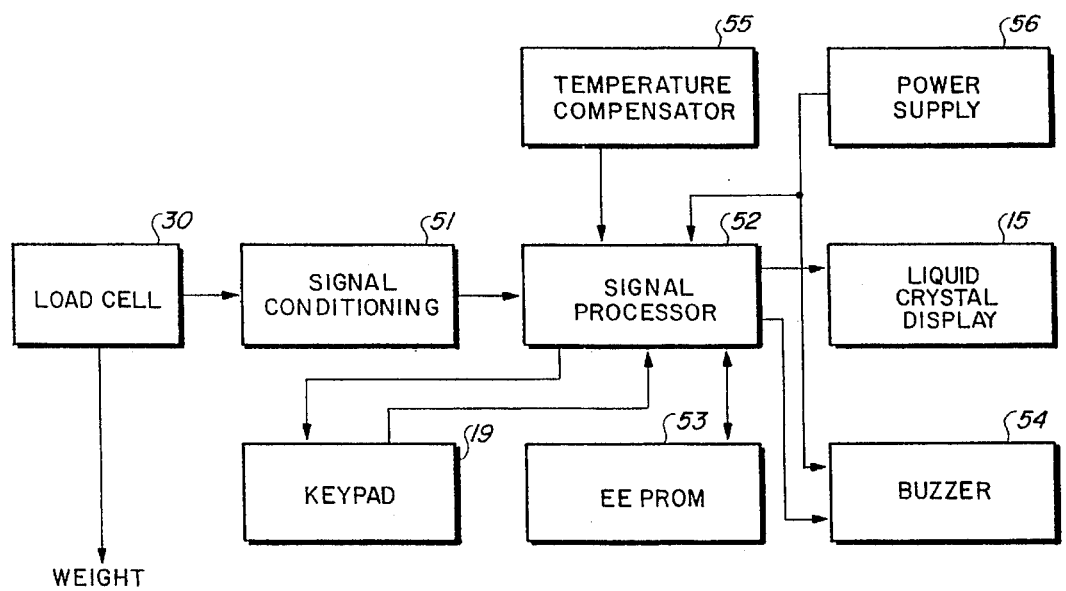
FIG. 3 is a view in perspective of the load cell utilized in the embodiment of FIG. 1.

The constructional features of the transducer utilized in the preferred embodiment are shown in FIGS. 3 and 4 wherein load cell 30 is shown comprising a cantilevered beam 31 having its fixed end 35 attached by fastener 32 to a planar beam support 36. The beam support 36 is provided with a large area opening with the free end 34 located thereabove. As shown, the beam support 36 is attached via opposing support legs 33 to case 12. A passageway is provided in the case beneath the middle region of the cantilevered beam 31. A distance translator 39 is affixed to free end 34 by fastener 38. The distance translator provides an attachment point for chain 29 which is proximate to the mid-point of the beam 31. This configuration enables the load cell to be generally centrally positioned at the bottom of case 12 with the chain extending outwardly therefrom at the approximate center at the bottom of the case. Since the device is hand-held during the weighing operation, it has proven advantageous to align the center of gravity of the unit being weighed with the central axis of the device 10. A stop 49 is affixed to free end 34 of the cantilevered beam and extends outwardly therefrom to limit vertical movement of the beam and thereby prevent damage to the load cell from overloading.

The support legs 33 shown in FIG. 4 may be formed as a molded feature of the case 12. The beam support 36 is affixed by suitable fasteners at each corner to the support legs. The cantilevered beam is attached by fastener 32 located proximate to the leads 37 which convey the electrical signal indicating the weight of the applied load. Load cells typically are provided with four output terminals since a bridge configuration is used to derive the weight signal. Two terminals are used to establish the zero reference level and the load signal appears between the other two terminals. The weight is transmitted through chain 29 to the distance translator 39 which conveys the load to free end 34 of the beam. Thus, the beam is free to bend in the downward direction from an axially applied load. The load cell 30 found particularly well-suited in the present embodiment is the model FR 1020 load cell manufactured and sold by the Futek Company.

The block schematic diagram of FIG. 5 shows the signal from load cell 30 being supplied to a signal conditioning block 51 wherein the signal from the load cell is converted to pulse form and supplied to signal processor 52.

The signal processor samples the signal from the load cell a number of times within a predetermined interval and averages them to arrive at a locked-in weight signal which it displays. A color code can then be assigned by using the enter key. The available color codes are retained in the EE Prom memory 53 and the processor assigns the next available color code to each weight until it reaches capacity, i.e. all available codes have been assigned. The signal processor successfully operated and tested in the embodiment shown in the model TSS 400 manufactured by Texas Instruments.

As shown in FIG. 5, the signal processor 52 is coupled to power supply 56 which is comprised of a standard 9 volt battery inserted into the case. A temperature compensation circuit 55 is provided to supply an adjustment signal to the signal processor if needed for significant ambient temperature variations. The compensation circuit is directly coupled to the signal processor, however it may be included in the signal processor circuitry. Subsequent operation of the signal processor is controlled by the user through the keypad 19 which enables the user to enter the fish being weighed into the memory 53 or to clear a weight and display a zero. When the user desires to view the total of the stored weights, the signal processor provides a sum of stored weights signal to the display. In the event that the user desires to scroll through the stored weights, the weights and associated codes are displayed in code sequence. However, should the user, after having affixed the most recent catch to the hook, want to display the lightest stored weight and associated code the cull key provides this information. In competition where time is at a premium, the user weighs the fish, hits the enter key to store coded data, tags the fish and places it in the live well. When the memory is at capacity, the actuation of the enter key will display the legend full. Upon weighing of the next fish, hitting the enter button will display the legend full following by a reversion to the weight of the fish on the hook. Next, the actuation of the cull key displays the lightest stored weight and its code. By depressing the enter key within three seconds, the processor performs a comparison check and, if the new weight is greater, substitutes the new weight for the old lesser weight in the memory. Should the newly weighed fish be lighter than all stored weights, the processor causes buzzer 54 to notify the user of the need to discard the recent catch.

In the embodiment as shown in FIG. 5, the components set forth as blocks represent commercially available components. The signal processor made by Texas Instruments is provided along with a program entitled SIMPLE LANGUAGE which enables the potential user of the product to download an object program from his computer through a connector to the signal processor via programming terminals 80. The signal processor then is programmed to carry out the functions previously recited when coupled to other components as shown in FIG. 5.

Figure 6B:
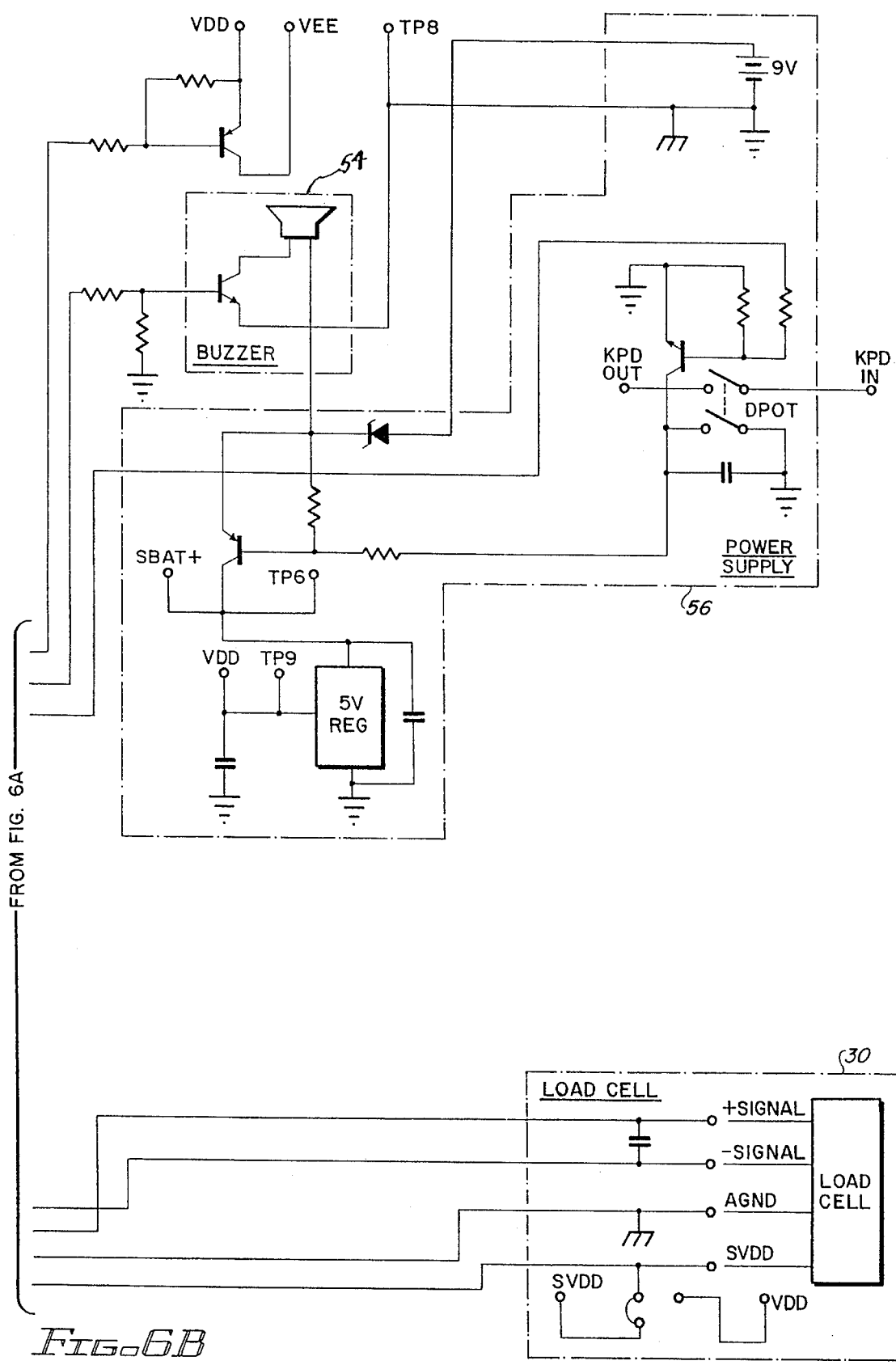

An electrical schematic diagram of an embodiment of the invention tested and operated in a fishing environment is shown in FIGS. 6A and 6B. The load cell 30 is shown as a four terminal device with the terminals connected to the signal conditioning circuit 51. The DC offset voltage which provides for the zero adjustment of the load cell is set initially by fixing potentiometer 70. Each weight signal is supplied to inverting amplifier 71 which is coupled by conductor 61 to the programmed signal processor 52. The signal processor has four analog inputs, one of which is the conditioned weight signal from the load cell. The three other inputs are the low battery determination via connection 63 and the two inputs 65 from the temperature compensator circuit 55. The other inputs to the signal processor are digital.

The signal processor converts the weighing signal to a digital signal and stores it in an internal register. The processor continues to sample each weighing signal over an interval of a few seconds and stores the results internally. At the end of the interval, it averages them, converts to pounds and ounces and displays the average signal which is also transferred to the EE Prom memory 53 after having a color code assigned. The locked-in reading continues to be displayed on the screen so that movement of either the boat or the fish on the hook do not result in a change in the displayed signal. The timing of the functions including the sampling intervals performed by the signal processor 52 are controlled by the reference oscillator 62.

The power supply from a 9 v. battery utilizes a 5 v. regulator circuit manufactured by National Semiconductor to establish the operating voltage level for the system. The low battery condition is sensed by the signal processor and a display then appears on the screen of the liquid crystal display 15. As shown, a DPDT switch is utilized with the signal processor responsive to the switch which is controlled by key 25 to activate the power supply and turn it on. The signal processor is programmed for a 4 minute on time following the entry of a command before turning off the converse battery power. The power supply 56 finishes power to the DC buzzer 54 which is controlled by the signal processor. The liquid crystal display 15 and the EE Prom 53 receive power from the signal processor 52 and are not coupled directly to the power supply in the embodiment shown.

The keys 20 through 24 which cause the signal processor to function appropriately are shown coupled between terminals of the signal processor. The power switch shown on the face of the embodiment in FIG. 1 is included in the power supply circuit 56 in FIG. 6.

While the foregoing description has referred to a specific embodiment of the invention it is to be noted that many modifications and variations may be made therein without departing from the scope of the invention as claimed.

We claim:

1. An electronic scale and display device for weighing, coding and sequentially displaying data from a plurality of weighted units, said device comprising:

a) a hand-grippable case containing a passageway therein;

b) a load cell mounted within said case proximate to the passageway, said load cell providing an electrical signal in response to a weight applied thereto;

c) a load hook coupled to the load cell for receiving weighted units;

d) a signal processor circuit contained within said case and coupled to the load cell for receiving sequential electrical signals therefrom, each signal corresponding to a weight applied to the load cell, said processor circuit comparing sequential electrical signals and identifying the signal for the least weight;

e) a key pad located in the case for actuation and coupled to the signal processor comparing received weight signals and, the actuation of the keypad assigning a code to each signal in the signal processor;

f) a storage memory coupled to the signal processor for storing each signal and the code assigned thereto and responsive to actuation of the keypad, and g) a display device located on the case and coupled to the signal processor for displaying the weight of a unit on the load hook and displaying stored codes and signals in accordance with the actuation of the keypad.

2. The electronic scale and display device in accordance with claim 1 wherein the signal processor assigns a nominal value to a code when no weighted unit is on the load hook and the keypad is actuated, said signal processor comparing only signals having other than the nominal value in identifying the signal for the least weight.

3. The electronic scale and display device in accordance with claim 2 wherein said signal processor is responsive to the actuation of the keypad to delete a signal from the storage memory.

4. The electronic scale and display device in accordance with claim 3 wherein said signal processor is responsive to the actuation of the keypad to sum stored signals and to provide a summed signal to the display device.

5. The electronic scale and display device in accordance with claim 1 wherein said load cell comprises a cantilevered beam having a fixed end and a free end, said free end being coupled to the load hook.

6. The electronic scale and display device in accordance with claim 5 further comprising a distance translator affixed to the free end of the beam and extending therebeneath toward the fixed end, said load hook being attached to the distance translator through the passageway in the case.

7. An electronic fish scale for weighing, storing and displaying the weight of a fish, said scale comprising:

a) a hand-grippable case having a central passageway therein;

b) a load cell contained within said case proximate to the passageway therein, said load cell providing an electrical weight signal indicative of the weight of an applied load;

c) a load hook coupled to the load cell for receiving a fish as the applied load;

d) a display panel located on said case for displaying the weight of the fish;

e) a signal processor for receiving the electrical weight signal from the load cell, assigning a stored code thereto and providing a code signal and a weight signal to the display panel, said signal processor sequentially providing code and weight signals in inverse order to the display panel;

f) a storage memory coupled to the signal processor for receiving code and weight signals from the signal processor and storing said signals, and g) a keypad having a plurality of keys coupled to the signal processor for displaying stored code and weight signals, the actuation of selected keys in said keypad sequentially displaying stored signals.

8. The electronic fish scale in accordance with claim 7 further comprising a signal conditioning circuit coupled between the load cell and the signal processor.

9. The electronic fish scale in accordance with claim 8 further comprising a temperature compensating circuit coupled to the signal processor.

10. The electronic fish scale in accordance with claim 9 further comprising an audible alarm circuit coupled to the signal processor and responsive to a false reading condition.

11. A method for culling data taken from the weighing of a plurality of units to cull the data of the unit having least weight which comprises the steps of:

a) determining the weight of each unit, b) assigning one of a limited number of codes to said weight determinations;

c) storing the weight determinations and assigned codes in a memory device;

d) comparing the weight of an additional unit exceeding the limited number with stored weight determinations to determine the unit having least weight;

e) culling the least weight from the memory device; and f) assigning the code from the least weight to said additional unit and storing the weight determination and code in the memory.

12. The method in accordance with claim 11 further comprising the step of displaying the weight of said additional unit before culling the least weight.

13. The method in accordance with claim 12 further comprising the step of initially displaying the weight of each unit and the code assigned thereto.

14. The method in accordance with claim 13 further comprising the step of sequentially displaying stored weight determinations and codes.

* * * * *

UNITED STATES PATENT AND TRADEMARK OFFICE
CERTIFICATE OF CORRECTION

PATENT NO.  : 5,545,855
DATED       : August 13, 1996
INVENTOR(S) : James R. Stanfield, et. al.

It is certified that error appears in the above-indentified patent and that said Letters Patent is hereby corrected as shown below:

Column 8, line 1
Claim 7., subparagraph e)
    a signal processor for receiving the electrical weight signal from the load cell, assigning a stored code thereto and providing a code signal and a weight signal to the display panel, said signal processor comparing received weight signal processors and, sequentially providing code and weight signals in inverse order to the display panel;

Signed and Sealed this

Fourteenth Day of January, 1997

Attest:

BRUCE LEHMAN

*Attesting Officer*      *Commissioner of Patents and Trademarks*